Patented July 14, 1936

2,047,663

UNITED STATES PATENT OFFICE 2,047,663

ALICYCLIC CARBINOL ESTERS OF POLYCARBOXYLIC ACIDS AND PROCESS OF MAKING THE SAME

Harold J. Barrett, Wilmington, and Wilbur A. Lazier, Marshallton, Del., assignors to E. I. du Pont de Nemours & Company, Wilmington, Del., a corporation of Delaware No Drawing. Application May 3, 1933, Serial No. 669,202

19 Claims. (Cl. 260—103)

This invention relates to new compositions of matter, more particularly to polycarboxylic acid esters of alicyclic alcohols, and still more particularly to the preparation of polycarboxylic acid esters of alicyclic carbinols.

An object of this invention is the preparation of polycarboxylic acid esters of alicyclic carbinols. A further object of the invention is a new class of compounds namely polycarboxylic acid esters of certain alicyclic carbinols.

These objects are accomplished by the following invention wherein polycarboxylic acids, acid anhydrides, acid chlorides or simple esters are reacted with alicyclic carbinols, or the alkali metal salts of the acids are reacted with halides of alicyclic carbinols under suitable conditions, the resulting products being isolated and used in the formulation of plastic and coating compositions.

The following examples are given to illustrate the preparation of polycarboxylic acid esters of alicyclic carbinols:

EXAMPLE I

Hexahydrobenzyl phthalate

A mixture containing 150 grams phthalic anhydride, 240 grams cyclohexyl carbinol, 200 grams ethylene dichloride, and 2 grams sulfuric acid was heated to boiling in an apparatus designed to separate the water from the distillate and return the ethylene dichloride to the reaction flask. Distillation was continued until the theoretical amount of water had been removed. The product was washed with sodium carbonate solution to remove the acid and then refined by heating under vacuum in the presence of decolorizing carbon until the temperature reached approximately 200° C. After filtering to remove the carbon, the product was substantially water-white and contained only a trace of unreacted alcohol. The melting point was approximately 35° C.

Other compounds prepared in a similar manner include beta-cyclohexylethyl sebacate, gamma-cyclohexylpropyl adipate, gamma-cyclohexylpropyl tartrate, methoxyhexahydrobenzyl hexahydrophthalate, methylhexahydrobenzyl chloro-4-tetrahydro-1, 2, 3, 6-phthalate, and the citric acid ester of decahydronaphthyl carbinol.

EXAMPLE II

Hexahydrobenzyl tetrahydrophthalate

A mixture containing 15 parts tetrahydrophthalic acid and 20 parts cyclohexylcarbinol was refluxed for 8 hrs. The product was neutralized with sodium carbonate solution and refined as in Example I.

Naphthenyl adipate may be prepared in a similar manner from adipic acid and naphthenyl alcohols. The latter are prepared by the carboxyl hydrogenation of naphthenic acids.

EXAMPLE III

Hexahydrobenzyl butyl phthalate

A mixture containing 70 grams phthalic anhydride and 55 grams cyclohexyl carbinol was heated at 130–150° C. for four hours, at which time the acid number indicated the formation of hexahydrobenzyl acid phthalate. Seventy-five grams butanol, 75 grams ethylene dichloride and 2 grams sulfuric acid were added to the above mixture and placed in the apparatus described in Example I. The esterification and refining from this point on was the same as in Example I.

EXAMPLE IV

Methoxyhexahydrobenzyl ethyl hexahydrophthalate

Twenty-three parts of ethyl hexahydrophthalate, 15 parts methoxycyclohexyl carbinol and one-tenth part sodium were refluxed until one-tenth mol. of ethanol had been removed. The product was refined as in Example I.

The esters prepared as above described are all more or less viscous liquids varying from water-white to light amber in color. They are high boiling and compatible with cellulose derivatives. The materials are of particular interest for use with cellulose nitrate since they are good solvents for this material and are readily soluble in ordinary lacquer solvents. Other alicyclic carbinols than those mentioned include the various homologs of cyclohexyl carbinol where the substitution is in the cyclohexyl ring or in the side chain. They include all carbinols prepared by hydrogenation of various aromatic organic acids and naphthenic acids. The substituents in the cyclohexyl ring may be hydrocarbon radicals, alkoxy aryloxy, or other ether groups, hydroxyl groups, amino groups, etc. Acids other than those mentioned which may be used include all polycarboxylic acids which do not decompose under the conditions necessary to form the esters.

EXAMPLE V

Hexahydro-o-xylylene glycol phthalate

Equimolar proportions of hexahydro-o-xylylene glycol and phthalic anhydride are heated together to about 190° C. until the evolution of water has ceased and the acid number is reduced to about 20. When cooled, the ester sets to a brittle resin and is soluble in the usual organic solvents such as esters and hydrocarbons.

In preparation of esters similar to the above, other polycarboxylic acids than phthalic may be used including succinic, adipic, sebacic, tartaric, maleic, hexahydrophthalic, citric, trimesic, glutaric, mellitic, etc. The acid must be one stable under the conditions of the reaction, that is, one which functions in the reaction as a polycarboxylic acid and which does not lose carbon dioxide to form a monobasic acid or a neutral material. Mellitic acid, even if losing carbon dioxide on strong heating, functions as a polycarboxylic acid since esters of lower carboxylated benzenes, for instance, trimesic acid, are formed. Esters of oxalic, malonic and mellitic acids with alicyclic carbinols may be made by less drastic methods, for example, from the alicyclic carbinyl chloride and an alkali metal salt or by ester interchange of alicyclic carbinols with the ester of the acid with a volatile alcohol.

In reacting alicyclic carbinols with a disbasic acid it is in general preferred to use an acid of at least 4 carbon atoms because of stability considerations.

Other polyhydric alicyclic carbinols may be used, a particularly useful group of carbinols being that of the carbinols obtainable from hydrogenated aromatic acids by the methods disclosed in the copending application of Wilbur A. Lazier, Serial No. 584,573, filed June 2, 1932. This group includes hexahydrosalicyl alcohol, 3,4-tetramethylenehexamethylene glycol (from o-phenylene-diacetc acid) and its isomers, 1,3,5-trimethylolcyclohexane from trimesic acid, 1,2,4-trimethylolcyclohexane from trimellitic acid, 1-methylol-3,5-dihydroxycyclohexane from resorcyclic acid, camphene glycol, sabinene glycol, camphyl glycol, abietyl alcohol, hydrogenated abietyl alcohol, etc.

The esters of the present invention are useful in coating and plastic compositions containing cellulose derivatives such as cellulose nitrate, cellulose propionate, cellulose acetate, ethyl cellulose, cellulose butyrate, cellulose acetobutyrate, benzyl cellulose, etc., with or without other plasticizers known to the art such as triacetin, camphor, dibutyl phthalate, tricresyl phosphate, and with or without resins, oils, pigments, fillers, and the like. For exceptional moistureproofing characteristics, waxes or waxy resins may be incorporated.

The compounds herein described may likewise be used as plasticizers and/or softeners for natural resins such as damar, congo, elemi, guaiac, kauri, rosin, etc., and synthetic resins such as polyhydric alcohol-polybasic acid resins, phenol-aldehyde resins, urea-aldehyde resins, vinyl resins, ester gums, ether resins, etc. They may be used alone or in conjunction with other modifiers for the resin such as waxes, etc.

The method for the preparation of the compounds described above is capable of considerable variation. In the esterification reaction, catalysts other than those mentioned may be used. Solvents other than those mentioned may be used to remove water, and in some cases solvents may be used without the use of a catalyst. The chloride of the acid may be reacted with the alicyclic alcohol or the alkali metal alcoholate, or the chloride of the alcohol may be reacted with the salt of the acid under suitable conditions. Other resins than damar, for example ester gum and certain other natural and synthetic resins may be used in the lacquer and plastic compositions mentioned above.

The alicyclic carbinols of the present invention may be represented by the formula, $$R\diagdown^{(C_nH_{2n}CH_2OH)_x}_{(C_mH_{2m}OH)_y}$$

in which R is a radical containing an at least partially hydrogenated aromatic residue, $m$ and $n$ are any positive number including 0, $x$ is any positive number from 1 to 3 inclusive, and $y$ has any value from 0 to 2, inclusive.

The monohydric and dihydric alicyclic carbinol esters and particularly the monohydric carbinol esters are preferred because of the greater availability of such carbinols as well as the higher compatibility of the esters with cellulose derivatives. For similar reasons dibasic acid esters are preferred. The above general formula represents a monohydric alcohol if the sum of $x$ and $y$ is 1, and a dihydric alcohol if the sum of $x$ and $y$ is 2.

The esters may be used in the preparation of all types of compositions containing cellulose esters and/or ethers. They may be used in the preparation of lacquers for coating wood, dopes for coating fabrics, moisture-proof lacquers for coating regenerated cellulose and similar films, and in plastic compositions to be used in the preparation of toilet ware, novelties, sheeting, rods, tubes, safety-glass interlayers and the like.

The compounds of the present invention are extremely high boiling and water resistant plasticizers for cellulose derivatives, giving permanently flexible products of good durability.

Polycarboxylic acid esters of alcohols obtainable by the carboxylic reduction of natural acidic resins, e. g., abietyl alcohol, are claimed in copending application Serial No. 749,070, filed October 19, 1934, which also discloses their use in numerous compositions. Naphthenyl esters of polybasic carboxylic acids are disclosed in copending application Serial No. 20,768, filed May 10, 1935.

As many apparent and widely different embodiments of this invention may be made without departing from the spirit thereof, it is to be understood that we do not limit ourselves to the foregoing examples or description except as indicated in the following claims.

We claim:
1. A process of preparing alicyclic carbinol esters of polycarboxylic acids comprising reacting a polycarboxylic acid stable under the conditions of the reaction with an alicyclic carbinol of the formula

$$R\diagdown^{(C_nH_{2n}CH_2OH)_x}_{(C_mH_{2m}OH)_y}$$

wherein R is a radical comprising an at least partially hydrogenated aromatic nucleus, $m$ and $n$ are any positive numbers including 0, $x$ is any positive number from 1 to 3 inclusive, and $y$ has any value from 0 to 2, inclusive.

2. A process of preparing alicyclic carbinol esters of dicarboxylic acids comprising reacting a dicarboxylic acid stable under the conditions of the reaction with an alicyclic carbinol of the formula $$R\diagdown^{(C_nH_{2n}CH_2OH)_x}_{(C_mH_{2m}OH)_y}$$

wherein R is a radical comprising an at least partially hydrogenated aromatic nucleus, $m$ and $n$ are any positive numbers including 0, $x$ is any positive number from 1 to 3 inclusive, and $y$ has any value from 0 to 2, inclusive.

3. A process of preparing alicyclic carbinol esters of dicarboxylic acids comprising reacting a dicarboxylic acid stable under the conditions of reaction with an alicyclic carbinol of the formula

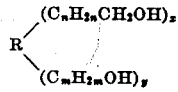

wherein R is a radical comprising an at least partially hydrogenated aromatic nucleus, $m$ and $n$ are any positive numbers including 0, $x$ is 1 or 2, $y$ is 0 or 1, the sum of $x$ and $y$ being not more than 2.

4. A process of preparing alicyclic carbinol esters of dicarboxylic acids comprising reacting a dicarboxylic acid stable under the conditions of reaction with an alicyclic carbinol of the formula $$R—C_nH_{2n}CH_2OH$$

wherein R is a radical comprising an at least partially hydrogenated aromatic nucleus and $n$ is any positive number including 0.

5. A process for preparing alicyclic carbinol esters of aliphatic saturated dicarboxylic acids which comprises reacting an aliphatic saturated dicarboxylic acid stable under the conditions of the reaction with an alicyclic primary carbinol.

6. As new compounds, the polycarboxylic acid esters of alicyclic carbinols of the formula

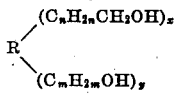

wherein R is a radical comprising an at least partially hydrogenated aromatic nucleus, $m$ and $n$ are any positive numbers including 0, $x$ is any positive number from 1 to 3 inclusive and $y$ has any value from 0 to 2, inclusive.

7. As new compounds, the polycarboxylic acid esters of alicyclic carbinols of the formula

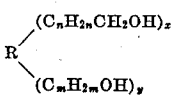

wherein R is a radical comprising an at least partially hydrogenated aromatic nucleus, $m$ and $n$ are any positive numbers including 0, $x$ is 1 or 2 and $y$ is 0 or 1, the sum of $x$ and $y$ being not more than 2.

8. As new compounds, the dicarboxylic acid esters of alicyclic carbinols of the formula

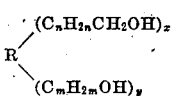

wherein R is a radical comprising an at least partially hydrogenated aromatic nucleus, $m$ and $n$ are any positive numbers including 0, $x$ is any positive number from 1 to 3, inclusive, and $y$ has any value from 0 to 2, inclusive.

9. As new compounds, the dicarboxylic acid esters of alicyclic carbinols of the formula

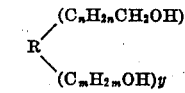

wherein R is a radical comprising an at least partially hydrogenated aromatic nucleus, $m$ and $n$ are any positive numbers including 0, $x$ is 1 or 2, and $y$ is 0 or 1, the sum of $x$ and $y$ being not more than 2.

10. As new compounds, the polycarboxylic acid esters of alicyclic carbinols of the formula $$RC_nH_{2n}CH_2OH$$

wherein R is a radical comprising an at least partially hydrogenated aromatic nucleus and $n$ is any positive number including 0.

11. A composition of matter comprising as a dominant component a polycarboxylic acid ester of an alicyclic carbinol of the formula

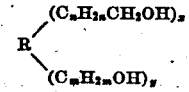

wherein R is a radical comprising an at least partially hydrogenated aromatic nucleus, $m$ and $n$ are any positive numbers including 0, $x$ is any positive number from 1 to 3, inclusive, and $y$ has any value from 0 to 2, inclusive.

12. A composition of matter comprising as a dominant component a polycarboxylic acid ester of an alicyclic carbinol of the formula

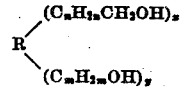

wherein R is a radical comprising an at least partially hydrogenated aromatic nucleus, $m$ and $n$ are any positive numbers including 0, $x$ is 1 or 2, and $y$ is 0 or 1, the sum of $x$ and $y$ being not more than 2.

13. A composition of matter comprising as a dominant component a dicarboxylic acid ester of an alicyclic carbinol of the formula

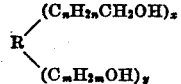

wherein R is a radical comprising an at least partially hydrogenated aromatic nucleus, $m$ and $n$ are any positive numbers including 0, $x$ is any positive number from 1 to 3, inclusive, and $y$ has any value from 0 to 2, inclusive.

14. A composition of matter comprising as a dominant component a dicarboxylic acid ester of an alicyclic carbinol of the formula

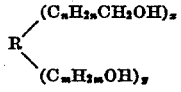

wherein R is a radical comprising an at least partially hydrogenated aromatic nucleus, $m$ and $n$ are any positive numbers including 0, $x$ is 1 or 2, and $y$ is 0 or 1, the sum of $x$ and $y$ being not more than 2.

15. A composition of matter comprising as a dominant component a polycarboxylic acid ester of an alicyclic carbinol of the formula $$R—C_nH_{2n}CH_2OH$$

wherein R is a radical comprising at least partially hydrogenated aromatic nucleus and $n$ is any positive number including 0.

16. The alicyclic primary carbinol esters of aliphatic saturated dicarboxylic acids.

17. As a new composition of matter hexahydrobenzyl phthalate.

18. As a new composition of matter gamma-cyclohexylpropyl adipate.

19. As a new compound hexahydroorthoxylylene glycol phthalate.

HAROLD J. BARRETT.
WILBUR A. LAZIER.